United States Patent

Hummel

Patent Number: 5,601,114
Date of Patent: Feb. 11, 1997

[54] FUEL TANK VALVE ASSEMBLY

[75] Inventor: Sean P. Hummel, Howell, Mich.

[73] Assignee: Pilot Industries, Inc., Dexter, Mich.

[21] Appl. No.: 594,637

[22] Filed: Feb. 2, 1996

[51] Int. Cl.⁶ .................. F02M 31/06; B65B 31/06
[52] U.S. Cl. ............... 137/588; 137/630.15; 141/59; 141/302; 251/78
[58] Field of Search ............ 141/59, 302; 137/588, 137/630.15; 251/77, 78

[56] References Cited

U.S. PATENT DOCUMENTS

| | | | |
|---|---|---|---|
| 4,706,708 | 11/1987 | Fornuto et al. | 137/588 |
| 4,724,861 | 2/1988 | Covert et al. | 137/588 |
| 4,765,504 | 8/1988 | Sherwood et al. | 141/59 |
| 4,826,511 | 5/1989 | Harris | 141/302 |
| 4,955,950 | 9/1990 | Seiichi et al. | 141/302 |
| 5,022,433 | 6/1991 | Jansky et al. | 141/59 |
| 5,103,877 | 4/1992 | Sherwood et al. | 137/588 |
| 5,186,220 | 2/1993 | Scharrer | 141/59 |
| 5,263,511 | 11/1993 | Ohasi et al. | 137/588 |
| 5,439,129 | 8/1995 | Buechler | 141/302 |

Primary Examiner—A. Michael Chambers
Attorney, Agent, or Firm—Gifford, Krass, Groh, Sprinkle, Patmore, Anderson & Citkowski, P.C.

[57] ABSTRACT

A valve assembly is provided for use in conjunction with a fuel tank having a fill neck and a vent conduit. The fill neck defines a passageway having one end open to the fuel tank and the second end adapted to receive fuel. Similarly, the vent conduit also has one end open to the fuel tank while the other end forms a second vent opening for allowing vapors to escape from the fuel tank during a filling operation. A fuel valve is fluidly positioned in series with the fill neck passageway and, similarly, a vent valve is fluidly positioned in series with the vent conduit. Both the fuel valve and vent valve are movable in unison between an open and a closed position so that, in the open position, fuel flow can occur through the fill neck and, simultaneously, fuel fumes are exhausted through the vent conduit. The vent valve includes an actuator which is coupled to a vent valve member by a spring to compensate for manufacturing tolerances of the valve assembly components in order to ensure complete closure of both the fill neck passageway and vent conduit when the fuel valve and vent valves are in their respective closed positions.

7 Claims, 2 Drawing Sheets

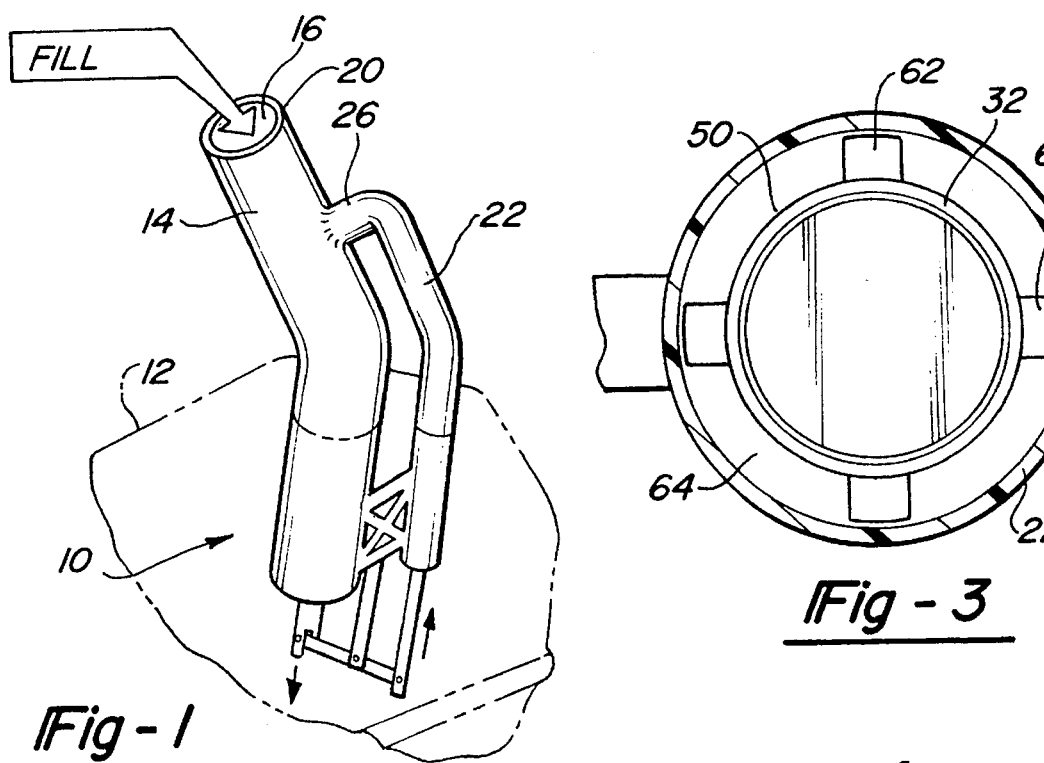
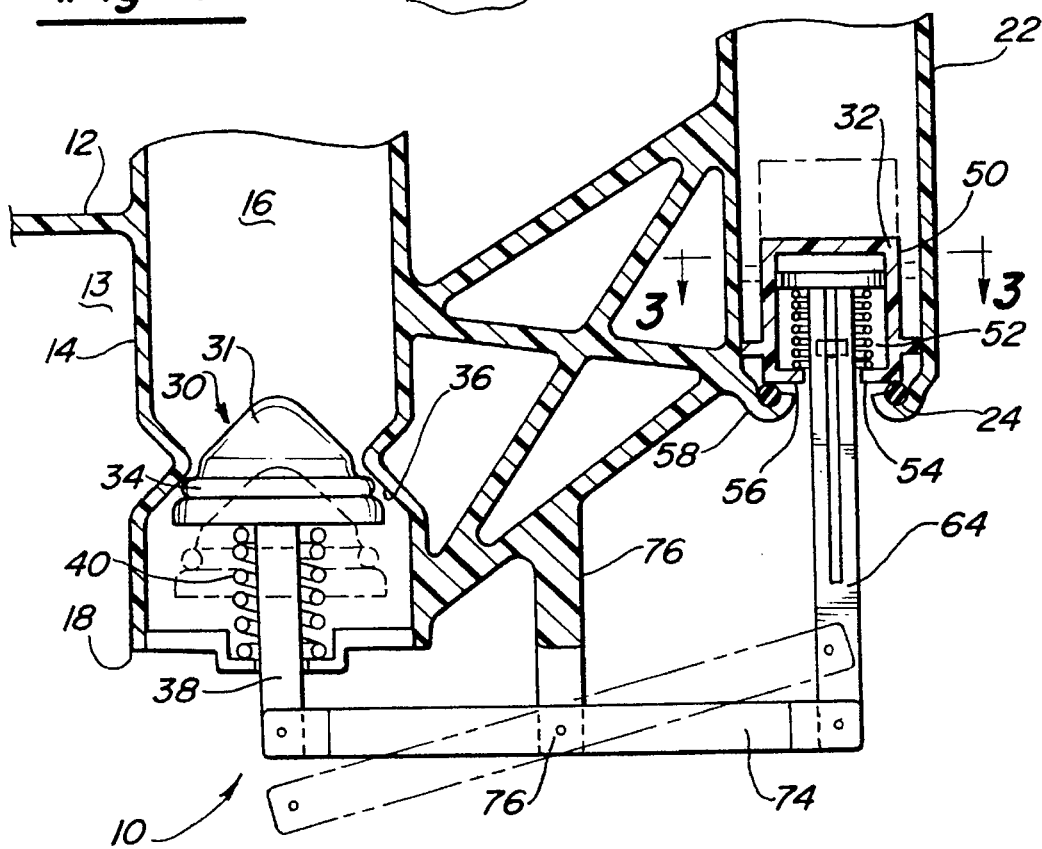

FUEL TANK VALVE ASSEMBLY

BACKGROUND OF THE INVENTION

I. Field of the Invention

The present invention relates generally to valve assemblies and, more particularly, to a valve assembly for use with a fuel tank.

II. Description of the Prior Art

Governmental regulations are becoming increasingly strict regarding the amount of hydrocarbons that can be emitted into the atmosphere from automotive vehicles. Such governmental regulations regulate not only the amount of hydrocarbons that can be exhausted from the automotive vehicle in the exhaust stream, but also hydrocarbons that enter into the atmosphere through leaks or other openings in the fuel system.

One major source of hydrocarbon pollutants that enter into the atmosphere from automotive vehicles results from fumes that escape from the fuel tank. Previously, many fuel tanks have been simply freely vented to the atmosphere which allows the automotive fuel fumes to freely and continuously enter the atmosphere.

In order to prevent the continuous venting of fuel fumes from the fuel tank, there have been previously known valve assemblies associated with the gas tank. These previously known valve assemblies operate to close the fill neck passageway except when the tank is filled with fuel. Consequently, the fuel vapors are vented to the atmosphere only when the fuel tank is filled with fuel.

With these previously known valve assemblies, however, it is also necessary to vent the fumes from the gas tank during the filling operation. In order to accomplish this, these previously known gas tank valve assemblies typically include two valves, a fuel valve which opens to permit fuel to enter into the tank during the filling operation, and a vent valve which opens to permit fumes to exhaust from the gas tank simultaneously with the entry of fuel.

One problem with these previously known gas tank valve assemblies is that the fuel and vent valves must not only operate in unison with each other, but must also firmly and sealingly close in all cases except during a filling operation. However, due to manufacturing tolerances, thermal expansion and the like, in many cases the vent valve and fill valve do not sealingly close in unison and with each other. When this occurs, leaks past either the fuel valve or the vent valve allow hydrocarbon vapors from the fuel tank to escape into the atmosphere.

SUMMARY OF THE PRESENT INVENTION

The present invention provides a valve assembly for a gas tank which overcomes all of the above-mentioned disadvantages of the previously known devices.

In brief, the valve assembly of the present invention comprises both a fuel valve and a vent valve. The fuel valve is positioned in series with the fill neck passageway. Similarly, the vent valve is fluidly positioned in series with a vent conduit having one end open to the fuel tank and a second opened to a vent outlet.

Both the fuel valve and vent valve are movable between an open and a closed position. A connecting link extends between both the fuel valve and the vent valve to ensure that the fuel valve and vent valve open and close in unison with each other. A helical compression spring associated with the fuel valve normally urges both the fuel valve and vent valve to their closed position.

In order to compensate for manufacturing tolerances, thermal expansion and the like and still insure that both the vent valve and fuel valve close in unison with each other, the vent valve further includes a valve member having an annular surface which sealingly engages a seat in the vent conduit. A valve actuator is then mechanically connected to the vent valve member by a compression spring while the actuator, in turn, is connected by a link to the fuel valve.

The compression spring associated with the vent valve thus ensures that the vent valve remains in a closed position despite movement of the actuator within the vent valve member within predefined limits. These predefined limits, furthermore, are sufficient to compensate for manufacturing tolerances, thermal expansion and the like.

BRIEF DESCRIPTION OF THE DRAWING

A better understanding of the present invention will be had upon reference to the following detailed description, when read in conjunction with the accompanying drawing, wherein like referenced characters refer to like parts throughout the several views, and in which:

FIG. 1 is a fragmentary elevational view illustrating a preferred embodiment of the present invention;

FIG. 2 is a cross sectional view illustrating the preferred embodiment of the present invention;

FIG. 3 is a sectional view taken substantially along line 3—3 in FIG. 2;

FIGS. 4 and 5 are fragmentary sectional views illustrating the vent valve in a closed position and diagrammatically illustrating the compensation for manufacturing tolerances, thermal expansion and the like.

DETAILED DESCRIPTION OF A PREFERRED EMBODIMENT OF THE PRESENT INVENTION

Figure 4:
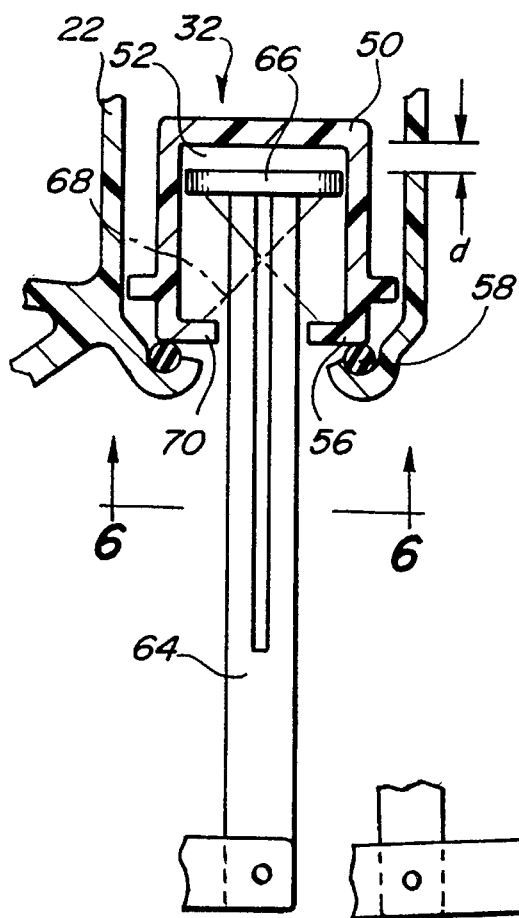

With reference first to FIGS. 1 and 2, a preferred embodiment of the valve assembly 10 of the present invention is there shown for use with a fuel tank 12 of the type found on automotive vehicles. The valve assembly 10 is positioned within the interior of the fuel tank 12 as best shown in FIG. 2.

A fill neck 14 defining a passageway 16 is fluidly connected to the interior 13 of the fuel tank 12 so that a lower end 18 of the passageway 16 is open to the fuel tank interior 13. The opposite or upper end 20 of the passageway 16 receives fuel in the conventional fashion.

Similarly, a vent conduit 22 has its lower end 24 positioned within the interior 13 of the fuel tank 12. An upper end 26 (FIG. 1) of the vent conduit 22 is fluidly connected to the fuel neck passageway 16 at a position spaced downwardly from its upper end 20.

With reference now particularly to FIG. 2, the valve assembly 10 comprises both a fuel valve 30 and a vent valve 32. The fuel valve 30 is positioned in series with the fuel neck passageway 16 and is movable between an open position, illustrated in phantom line, and a closed position, illustrated in solid line. In its closed position, an annular seal 34 carried by a fuel valve member 31 of the fuel valve 30 sealingly engages an annular valve seat 36 formed on the fuel neck 14 adjacent its lower end 18.

A valve actuator 38 extends axially downwardly from the fuel valve member 31. A helical compression spring 40 disposed around the actuator 38 normally urges the fuel valve 30 to its closed position (solid line). The spring constant of the compression spring 40 is such that fuel flow through the fill neck 14 will cause the fuel valve 30 to open against the force of the spring 40 and allow fuel to flow through the fill neck passageway 16 and into the fuel tank 12.

Still referring to FIG. 2, the vent valve includes both a cylindrical valve housing 50 defining a cylindrical chamber 52 open at its lower end through an opening 54. The vent valve 32 is movable between a closed position, illustrated in solid line, and an open position, illustrated in phantom line. In its closed position, an annular surface 56 on the housing 50 abuts against a resilient seal 58 carried at the lower end of the vent conduit 22. Thus, with the vent valve 32 in its closed position, the valve 32 prevents fuel fumes from the gas tank 12 from venting out through the conduit 22 to the atmosphere. Conversely, with the vent valve 32 in its open position, e.g. during a fuel filling operation, fuel fumes are permitted to exhaust through the vent conduit 22.

As best shown in FIG. 3, a plurality of circumferentially, spaced tabs 62 extend radially outwardly from the housing 50 so that an outer end of each tab 62 is positioned adjacent the inner surface of the vent conduit 22. These tabs 62 are preferably of a one piece construction with the vent valve housing 50 and ensure that the vent of valve housing 50 remains centered within the conduit 22 for proper seating with the seal member 58. These tabs 62 also ensure that a space 64 is formed between the housing 50 and conduit 22 when in the open position to allow the fuel fumes to freely exhaust from the gas tank 12.

With reference now particularly to FIG. 4, an elongated valve actuator 64 has an enlarged diameter head 66 at one end. This enlarged head 66 is positioned within the chamber 52 of the vent valve housing 50. Thereafter, a helical compression spring 68 is sandwiched in between the enlarged head 66 of the actuator 64 and an inwardly extending lip 70 integrally formed with the vent valve housing 50. The spring 68, furthermore, is in a state of compression thus urging the annular surface 56 of the valve housing 50 against its cooperating seal 58 on the vent conduit 22. The spring 68 thus maintains the vent valve 32 in a closed position and prevents escape of fumes from the gas tank through the conduit 22. The spring constant of the spring 68, however, is less than the spring 40.

Figure 5:
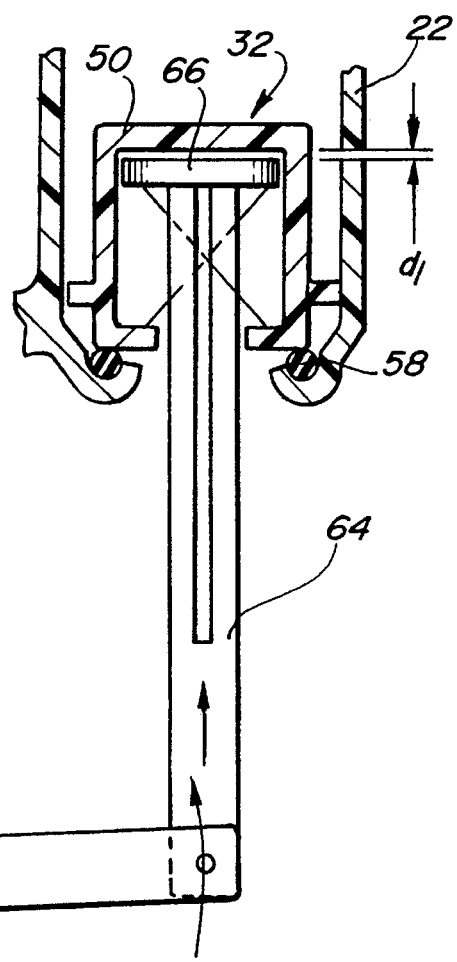
Figure 6:
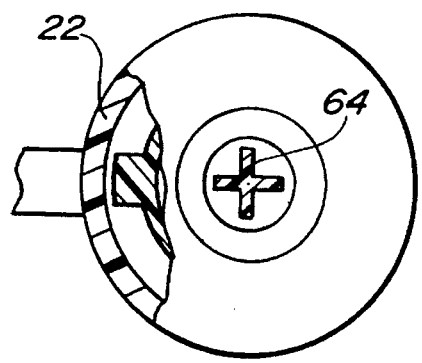
FIG. 6 is a sectional view taken substantially along the line 6—6 in FIG. 4.

With reference now to FIGS. 4 and 5, the compression spring 68 also ensures that the vent valve 32 is maintained in the closed position and that the surface 56 remains sealingly engaged with its seal 58 despite manufacturing tolerances, thermal expansion and the like. For example, in FIG. 4, with the vent valve 32 in its closed position, the space between the actuator head 66 and the top of the housing 50 is illustrated at "d". Conversely, if due to manufacturing tolerances, the actuator 64 is shifted upwardly within predefined limit 64 so that the distance "$d_1$" between the head 66 and the housing 50 is reduced, the vent valve 32 still remains in a closed position and prevents the flow of fuel vapors through the conduit 22. It will be appreciated, of course, that the compensation provided by the compression spring 68, which ensures complete sealing between the vent valve 32 and the vent conduit 22, occurs within predefined limits of movement of the actuator 64.

With reference again to FIG. 2, an elongated link 74 is pivotally connected to the lower end of both the fuel valve actuator 38 and vent valve actuator 64. The link 74 is pivotally connected at a midpoint 76 to a cross support 78 secured to the fill neck 14 and vent conduit 22. The link 74 ensures that the fuel valve 30 and vent valve 32 move in unison between their open and closed position.

In practice, the spring 40 (FIG. 2) normally maintains both the fuel valve 30 and vent valve 32 in their closed position thus preventing fuel vapors from the interior chamber 13 of the fuel tank 12 from escaping through either the fill neck passageway 16 or vent conduit 22. Furthermore, the spring 40 maintains both the fuel valve 30 and vent valve 32 in their closed position despite manufacturing tolerances, thermal expansion, etc. that might otherwise shift the axial position of the vent valve actuator 64 between predefined limits (see FIGS. 4 and 5).

Whenever the fuel tank 12 is filled through the fuel neck passageway 16, the flow of the fuel causes the fuel valve 30 to move to its open position (phantom line in FIG. 2) which simultaneously moves the vent valve 32 to its open position. Once the filling operation is complete, the compression spring 40 returns both the fuel valve 30 and vent valve 32 to their closed positions.

Having described my invention, however, many modifications thereto will become apparent to those skilled in the art to which it pertains without deviation from the spirit of the invention as defined by the scope of the appended claims.

I claim:

1. A valve assembly for use in conjunction with a fuel tank having a fill neck and a vent conduit, said fill neck defining a passageway having one end open to said fuel tank and a second end adapted to receive fuel, said vent conduit having one end open to said fuel tank and a second end forming a vent opening, a valve assembly comprising:

a fuel valve fluidly positioned in series with said fill neck passageway, said fuel valve movable along a first axis from a closed position to an open position in response to fuel flow through said fill neck passageway, a vent valve fluidly positioned in series with said vent conduit, said vent valve movable along a second axis between an open and a closed position, said first and second axes being spaced apart and parallel to each other, means for connecting said fuel and vent valves together so that said valves move in unison between their respective open and closed positions, said connecting means comprising an elongated link having one end connected to said fuel valve and a second end connected to said vent valve, said link having a mid point connected to said fill neck, said link extending in a direction transverse to said first and second axes, means for urging said fuel and vent valves towards their respective closed positions, wherein said vent valve further comprises an actuator and a valve member, said actuator being connected to said connecting means, said valve member having an annular surface which sealingly engages a seat on said vent conduit when said vent valve assembly is in said closed position, and resilient means for connecting said actuator to said valve member so that said valve member remains in said closed position despite movement of said actuator within predefined limits.

2. The invention as defined in claim 1 wherein said urging means comprises a compression spring.

3. The invention as defined in claim 2 wherein said compression spring has one end in abutment with said fuel valve and a second end in abutment with a portion of said fill neck.

4. The invention as defined in claim 1 wherein said vent valve member comprises a cylindrical housing defining an interior chamber open at one end, a portion of said actuator being positioned within said housing chamber, and wherein said resilient means comprises a compression spring sandwiched in between said actuator portion and a part of said housing.

5. The invention as defined in claim 4 wherein said housing includes an annular lip around said end of said housing chamber, said compression spring having one end in abutment with said lip.

6. The invention as defined in claim 5 wherein said actuator comprises an enlarged head positioned within said housing chamber, a second end of said compression spring being in abutment with said actuator head.

7. The invention as defined in claim 1 wherein said vent valve and said fill valve are made of plastic.

\* \* \* \* \*